(12) United States Patent (10) Patent No.: US 9,250,072 B2
Lévy (45) Date of Patent: Feb. 2, 2016

(54) MEASURING AND/OR PLOTTING AND/OR SIGHTING INSTRUMENT

(71) Applicant: Robert Lévy, Thônex (CH)

(72) Inventor: Robert Lévy, Thônex (CH)

( * ) Notice: Subject to any disclaimer, the term of this patent is extended or adjusted under 35 U.S.C. 154(b) by 57 days.

(21) Appl. No.: 14/299,757

(22) Filed: Jun. 9, 2014

(65) Prior Publication Data

US 2014/0360038 A1 Dec. 11, 2014

(30) Foreign Application Priority Data

Jun. 10, 2013 (CH) .......................................... 1086/13
Jun. 10, 2013 (FR) ...................................... 13 55306

(51) Int. Cl.
*B43L 13/10* (2006.01)
*G01C 15/00* (2006.01)
*B43L 9/08* (2006.01)
*B43L 13/00* (2006.01)

(52) U.S. Cl.
CPC . *G01C 15/00* (2013.01); *B43L 9/08* (2013.01); *B43L 13/001* (2013.01)

(58) Field of Classification Search
CPC .......... B43L 9/08; B43L 13/001; G01C 15/00
USPC .................. 33/1 G, 22, 23.01, 25.1, 25.5, 278
See application file for complete search history.

(56) References Cited

U.S. PATENT DOCUMENTS

| 370,939 | A | * | 10/1887 | Frankenberg | ........... | B43L 13/10 |
| | | | | | | 33/25.5 |
| 834,470 | A | * | 10/1906 | Hanssen | ................. | B44B 3/002 |
| | | | | | | 33/25.1 |
| 1,952,494 | A | * | 3/1934 | Gafford | ................. | A47G 19/08 |
| | | | | | | 33/25.5 |

(Continued)

FOREIGN PATENT DOCUMENTS

CN 201172337 Y 12/2008
DE 1800343 B1 7/1970

(Continued)

OTHER PUBLICATIONS

French Search Report of corresponding French Application No. 13 55306, dated Feb. 21, 2014; with partial English translation.

(Continued)

*Primary Examiner* — G. Bradley Bennett
(74) *Attorney, Agent, or Firm* — Westerman, Hattori, Daniels & Adrian, LLP

(57) ABSTRACT

The invention relates to a measuring and/or plotting and/or sighting instrument (1) comprising a first marker (8*a*), a second marker (8*b*), a third marker (8*c*) and a fourth marker (8*d*) linked together by a link element (10) allowing a relative displacement of the markers according to the following formula:

$$\frac{d1}{d2} = \frac{d1}{d6} = \Phi$$

with:
d1 being the distance between the first and fourth markers;
d2 being the distance between the second and fourth markers;
d6 being the distance between the first and third markers; and
Φ being a constant number, notably Φ is equal or substantially equal to 1.5 or 1.6 or 1.62 or 1.618 or $(1+\sqrt{5})/2$.

20 Claims, 5 Drawing Sheets

(56) References Cited

U.S. PATENT DOCUMENTS

| | | | | |
|---|---|---|---|---|
| 3,475,819 A * | 11/1969 | Glavan | .................... | B43L 13/10 33/25.1 |
| 4,527,341 A * | 7/1985 | Schon | ...................... | G01B 5/24 33/25.1 |
| 6,425,185 B1 * | 7/2002 | Regnault | .................... | B41J 2/49 33/18.2 |
| 7,373,727 B2 * | 5/2008 | Bruce | ....................... | B43L 7/10 33/25.1 |
| 8,852,192 B2 * | 10/2014 | Shimko | .............. | A61B 17/1635 33/25.1 |
| 2009/0211104 A1 * | 8/2009 | Thorkelson | ............... | B43L 9/08 33/1 K |
| 2009/0255137 A1 * | 10/2009 | Apkarian | ............... | B25J 9/1679 33/23.01 |
| 2013/0291392 A1 * | 11/2013 | Swamy | .................. | G01B 3/002 33/415 |

FOREIGN PATENT DOCUMENTS

| | | |
|---|---|---|
| JP | 60-171391 U | 11/1985 |
| SU | 1719249 A1 | 3/1992 |

OTHER PUBLICATIONS

"Golden Mean Art", Aug. 19, 2012, URL:http://web.archive.org/web/20120819074153/http://www.goldenmeanart.com/.

* cited by examiner

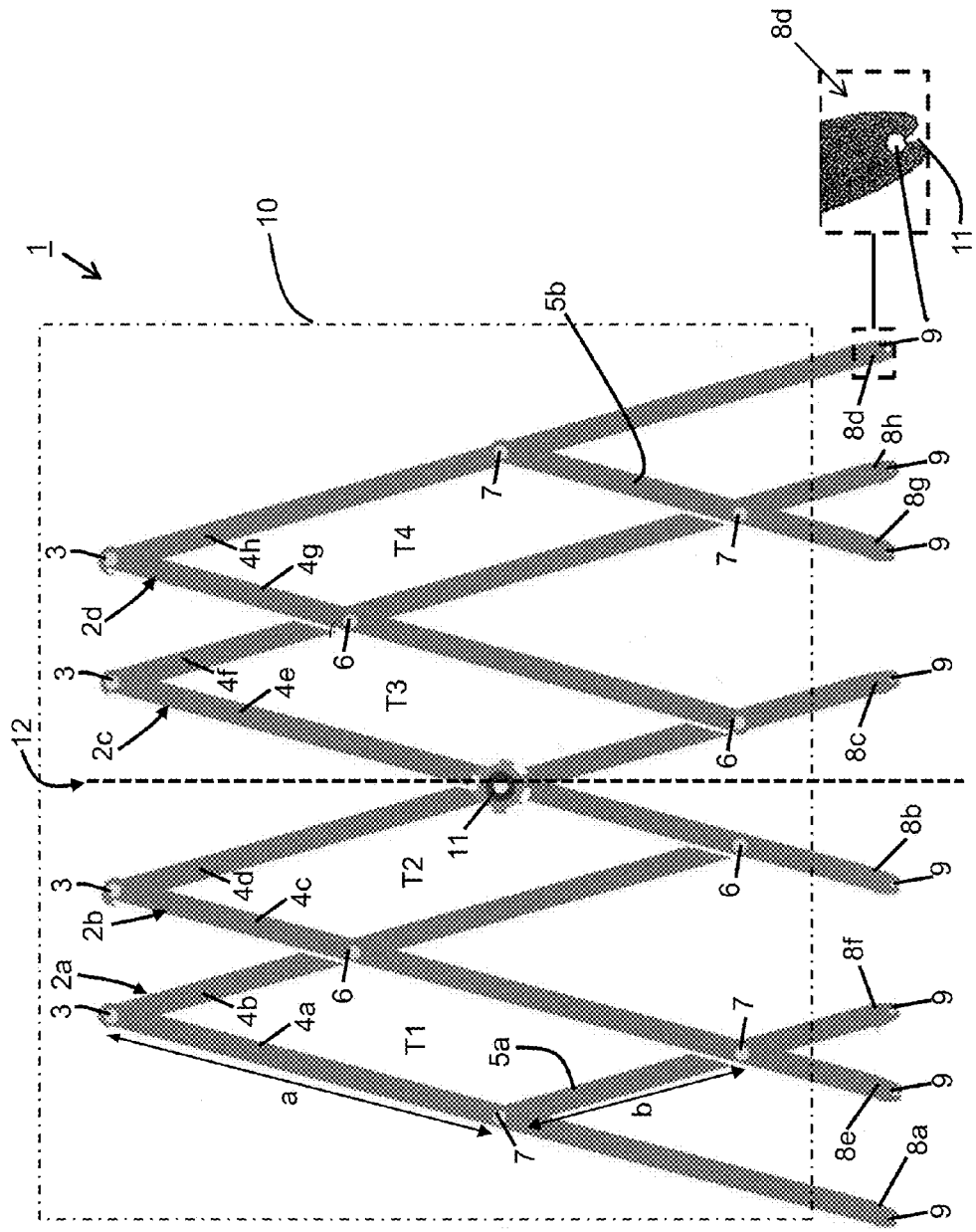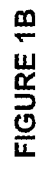
FIGURE 1A
FIGURE 1B

MEASURING AND/OR PLOTTING AND/OR SIGHTING INSTRUMENT

The present invention relates to the field of measuring and/or plotting and/or sighting instruments, and to the use of such an instrument.

Such measuring and/or plotting and/or sighting instruments are generally used to produce architectural drawings or works of art such as paintings or even sculptures.

In the context of such productions, it is often necessary to quantify and measure the objects, people or even environments that have to be reproduced in order in particular to be able to represent them in realistic proportions.

For this, measuring instruments are known from the prior art that implement the so-called "golden number" principle.

However, such instruments are often very bulky and are also complicated to use. In fact, they systematically require tedious and lengthy calculations to be performed which are not suited to a regular use of these instruments in the context of such productions.

The present invention aims to resolve these problems resulting from the drawbacks of the prior art.

Advantageously, the measuring and/or plotting and/or sighting instrument of the present invention has little bulk and can be used easily.

With this in mind, the invention relates to a measuring and/or plotting and/or sighting instrument comprising a first marker, a second marker, a third marker and a fourth marker linked together by a link element allowing a relative displacement of the markers according to the following formula:

$$\frac{d1}{d2} = \frac{d1}{d6} = \Phi$$

with:
- d1 being the distance between the first and fourth markers;
- d2 being the distance between the second and fourth markers;
- d6 being the distance between the first and third markers; and
- $\Phi$ being a constant number, notably $\Phi$ is equal or substantially equal to 1.5 or 1.6 or 1.62 or 1.618 or $(1+\sqrt{5})/2$, and/or
comprising a first marker, a second marker, a third marker, a fourth marker and a fifth marker linked together by a link element allowing a relative displacement of the markers according to the following formula:

$$\frac{d1}{d2} = \frac{d3}{d4} = \Phi$$

with:
- d1 being the distance between the first and fourth markers;
- d2 being the distance between the second and fourth markers;
- d3 being the distance between the third and fourth markers;
- d4 being the distance between the fifth and fourth markers;
- $\Phi$ being a constant number, notably $\Phi$ is equal or substantially equal to 1.5 or 1.6 or 1.62 or 1.618 or $(1+\sqrt{5})/2$, and/or
comprising a first marker, a second marker, a third marker, a fourth marker, a fifth marker and a sixth marker linked together by a link element allowing a relative displacement of the markers according to the following formula:

$$\frac{d1}{d2} = \frac{d3}{d4} = \frac{d4}{d5} = \Phi$$

with:
- d1 being the distance between the first and fourth markers;
- d2 being the distance between the second and fourth markers;
- d3 being the distance between the third and fourth markers;
- d4 being the distance between the fifth and fourth markers;
- d5 being the distance between the sixth and fourth markers; and
- $\Phi$ being a constant number, notably $\Phi$ is equal or substantially equal to 1.5 or 1.6 or 1.62 or 1.618 or $(1+\sqrt{5})/2$.

According to particular embodiments:
- the link element comprises in particular four deformable parallelograms (T1, T2, T3, T4), notably parallelograms in which the ratio of lengths of two contiguous sides is equal to $$\frac{a}{b} = \Phi;$$

- the link element comprises branches capable of forming, at their free end, a marker sighting to define a measurement, said branches being linked together by articulation elements so as to provide a trend between an unfolded position in which the markers are distant from one another and a folded position in which these markers are substantially side by side with one another;
- the link element comprises sub-branches of a length less than that of the branches;
- the branches form four pairs of branches which are linked together at one of their ends by an articulation element;
- a branch of each pair of branches is linked to two branches of different pairs by articulation elements;
- the sub-branches are each linked by articulation elements to two branches of different pairs comprising fewer than three articulation elements;
- the free end of the sub-branches forms a marker sighting to define a measurement;
- each marker comprises a housing capable of receiving an element suitable for producing a pointing and/or a measurement marking;
- the markers are contained on one and the same line;
- the link element comprises an element for locking said instrument in a given position;
- the ends of a branch or of a sub-branch comprise articulation elements;
- the sub-branches are straight and of the same length;
- the branches are straight, and
- the sub-branches are straight and of the same length.

The invention relates also to a use of such a measuring and/or plotting and/or sighting instrument, comprising the following steps:
- positioning and unfolding said instrument in a given position;
- maintaining said instrument in the given position, and marking the measurement performed.

Other advantages and features of the invention will become more apparent on reading the following description of a preferred embodiment, with reference to the figures below, produced as an indicative and nonlimiting example:

FIG. 1A represents a measuring and/or plotting and/or sighting instrument in an unfolded position according to this embodiment of the invention;

FIG. 1B is a larger-scale view of a marker of the measuring and/or plotting and/or sighting instrument illustrated in FIG. 1A;

The measuring and/or plotting and/or sighting instrument 1 illustrated in FIGS. 1A to 4 makes it possible, in addition to being simple to use, to produce a plot plan 24 based on the golden number in order to place, in the context of the production of architectural drawings or works of art such as paintings or sculptures, the centre or centres of interest of the object, of this production, that has or have to be represented.

This instrument 1 comprises the markers 8a, 8b, 8c, 8d, 8e, 8f, 8g, 8h, linked together by a link element capable of proportionally varying the distances d1, d2, d3, d4, d5 and d6 contained between these different markers.

Figure 2:
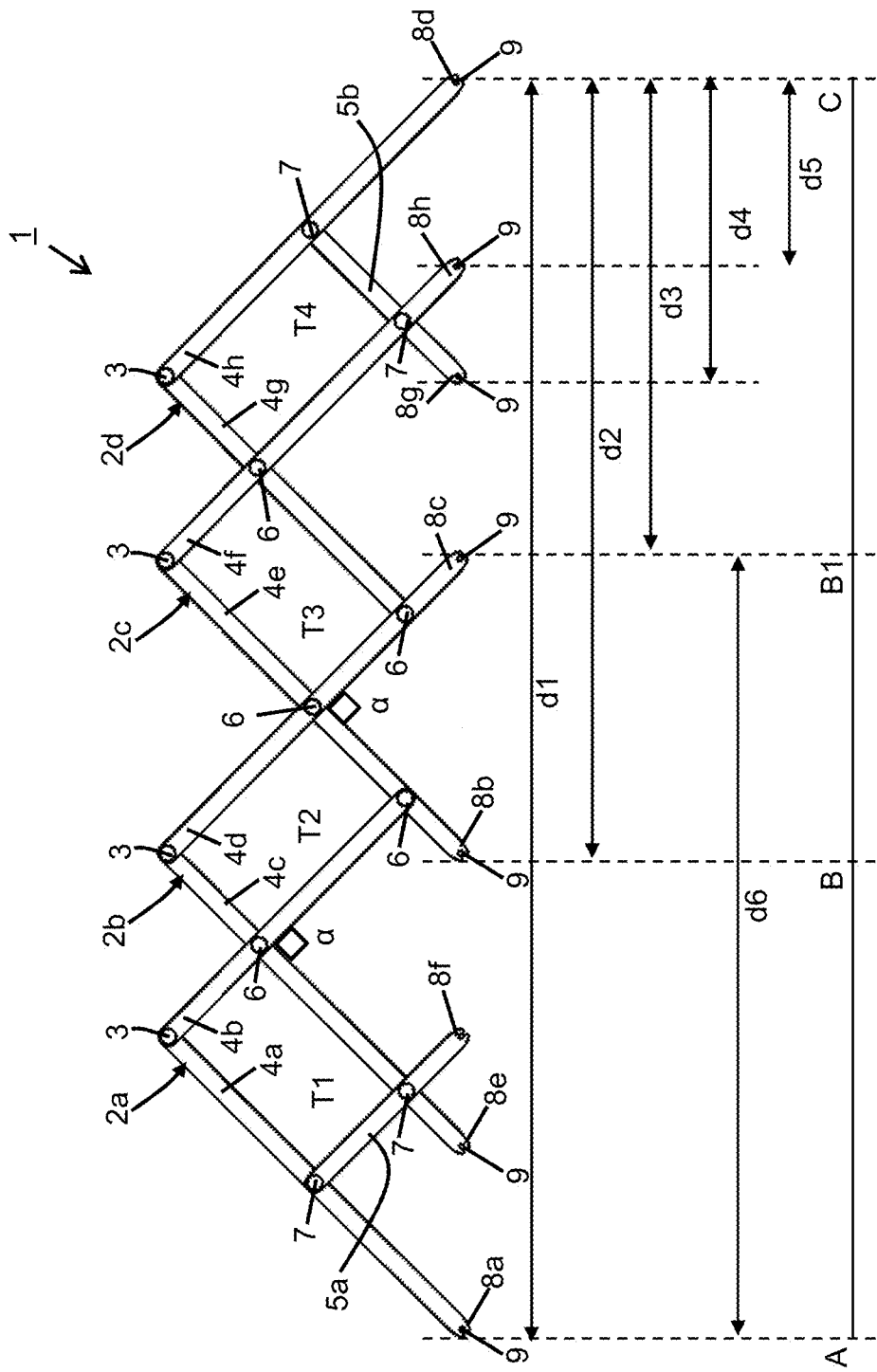
FIG. 2 represents the measuring and/or plotting and/or sighting instrument which is in a particular unfolded position according to this embodiment of the invention.

As is illustrated in FIG. 2, these distances correspond for:
- d1 to that which is contained between the outer markers 8a and 8d;
- d2 to that which is contained between the inner marker 8b and the outer marker 8d;
- d3 to that which is contained between the inner marker 8c and the outer marker 8d or else between the inner marker 8b and the outer marker 8a;
- d4 to that which is contained between the intermediate marker 8g and the outer marker 8d or else between the intermediate marker 8f and the outer marker 8a;
- d5 to that which is contained between the intermediate marker 8h and the outer marker 8d or else between the intermediate marker 8e and the outer marker 8a, and
- d6 to that which is contained between the outer marker 8a and the inner marker 8c.

Thus, when the instrument 1 comprises a first marker 8a, a second marker 8b, a third marker 8c and a fourth marker 8d linked together by a link element 10, the latter allows a relative displacement of these markers according to the following formula:

$$\frac{d1}{d2} = \frac{d1}{d6} = \Phi$$

When this instrument 1 comprises a first marker 8a, a second marker 8b, a third marker 8c, a fourth marker 8d and a fifth marker 8g linked together by a link element 10, the latter allows a relative displacement of these markers according to the following formula:

$$\frac{d1}{d2} = \frac{d3}{d4} = \Phi$$

And when this instrument 1 comprises a first marker 8a, a second marker 8b, a third marker 8c, a fourth marker 8d, a fifth marker 8g and a sixth marker 8h linked together by a link element 10, the latter allows a relative displacement of these markers according to the following formula:

$$\frac{d1}{d2} = \frac{d3}{d4} = \frac{d4}{d5} = \Phi$$

$\Phi$ is a constant number which is notably equal or substantially equal to 1.5 or 1.6 or 1.62 or 1.618 or $(1+\sqrt{5})/2$.

The link element of this instrument 1 can comprise four deformable parallelograms T1, T2, T3, T4. For each of these parallelograms T1, T2, T3, T4, the ratio of the length of their side a of greater dimension with the side b of smaller dimension, contiguous to the side a, is equal to the value of $\Phi$, i.e.:

$$\frac{a}{b} = \Phi.$$

It will be noted that when the instrument 1 comprises four markers 8a, 8b, 8c, 8d linked together by the link element 10 which can vary the distances d1, d2 and d3 contained between these markers, the position of the primary and secondary golden lines is determined on the basis of the markers 8b and 8c.

This link element 10 illustrated in FIGS. 1A to 4 comprises:
- branches 4a, 4b, 4c, 4d, 4e, 4f, 4g, 4h;
- articulation elements 3, 6, 7;
- sub-branches 5a, 5b;
- a locking element 11.

The branches 4a, 4b, 4c, 4d, 4e, 4f, 4g, 4h can be made of a plastic material, of wood or even of a metal or alloy such as aluminium or even stainless steel that can be anodized. They can be straight or curved. Among these branches 4a to 4h, the branches 4a, 4c, 4d, 4e, 4f, 4h have a different length from that of the branches 4b and 4g.

These branches 4a to 4h have, for example, the following dimensions:
- width of approximately 7.5 to 8.5 mm;
- thickness of approximately 1.5 to 2.3 mm, and
- length, for:
  - the branches 4a, 4c, 4d, 4e, 4f, 4h, of approximately 180 to 185 mm;
  - the branches 4b, 4g, of approximately 149 to 152 mm.

These branches 4a, 4b, 4c, 4d, 4e, 4f, 4g, 4h comprise two ends, one of which comprises an articulation element 3 making it possible to link it to another branch. The other end, called "free" notably because it is not linked to another branch by an articulation element 3, can form a marker 8a, 8b, 8c, 8d, 8e, 8h sighting to define a measurement or, alternatively, comprise an articulation element 6.

It will be noted that these articulation elements 3 act as pivots, helping to reduce the bulk of the instrument 1 when it is folded up and to offer a wide overall aperture angle when it is unfolded.

In FIGS. 1 and 2 for example, the instrument 1 comprises eight branches 4a, 4b, 4c, 4d, 4e, 4f, 4g, 4h, of which six comprise markers 8a, 8b, 8c 8d, 8e, 8f, 8g, 8h at their so-called free end—the branches 4a, 4c, 4d, 4e, 4f and 4h—and two comprise, at this end, an articulation element 6—the branches 4b and 4g.

In a variant, the instrument 1 can comprise branches 4a, 4b, 4c, 4d, 4e, 4f, 4g, 4h, for which the so-called free end comprises only markers.

As seen previously, the instrument 1 also comprises sub-branches 5a and 5b. These sub-branches 5a and 5b form, at their free end, a marker 8f, 8g.

They can be straight or curved and of the same length. They can be made of a rigid material such as plastic, wood or even a metal or alloy such as aluminium or stainless steel that can be anodized.

They generally have the same dimensions. These dimensions correspond, for example:
- length of approximately 92 to 96 mm;
- width of approximately 7.5 to 8.5 mm, and
- thickness of approximately 1.5 to 2.3 mm.

It will be noted that these sub-branches 5a, 5b have a length which is less than that of the branches 4a to 4h of the measuring and/or plotting and/or sighting instrument 1.

Figure 3:
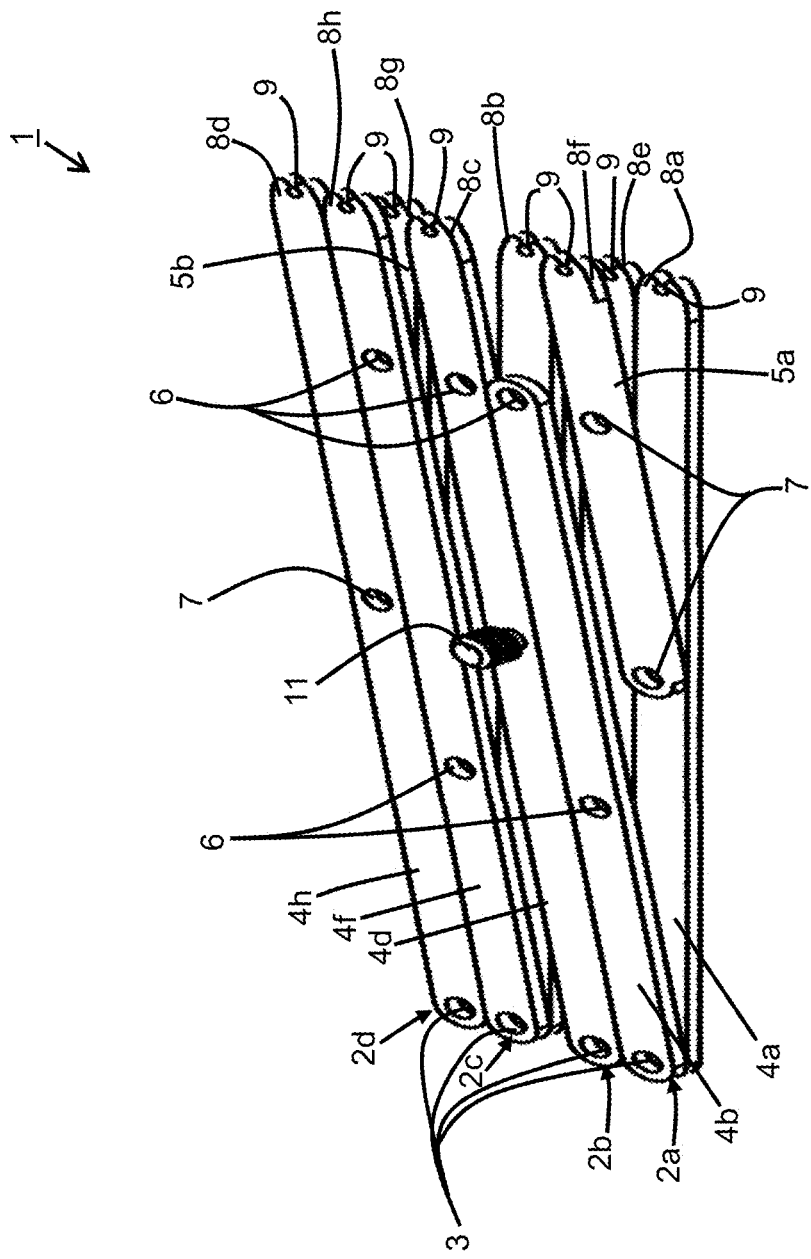
FIG. 3 is a plan view of the front face of the instrument according to this embodiment of the invention.
Figure 4:
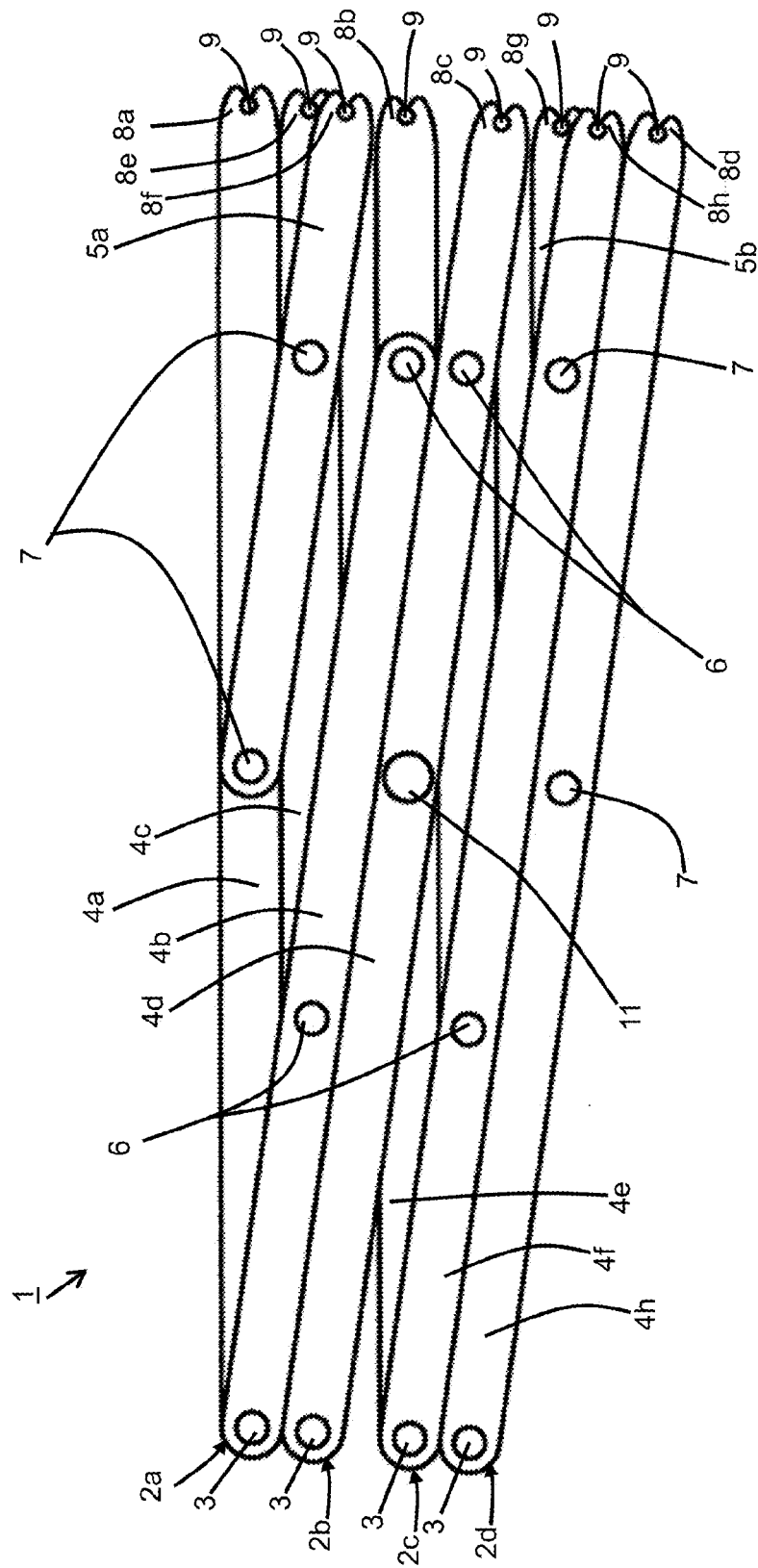
FIG. 4 is a plan view of the rear face of the instrument according to this embodiment of the invention.

In this instrument 1, the branches 4a to 4h and the sub-branches 5a, 5b are linked together by articulation elements 3, 6 and 7 so as thus to provide a trend between an unfolded position, as is illustrated in FIGS. 1 and 2, and a folded position such as is represented in FIGS. 3 and 4, and vice-versa.

The function of these articulation elements 6, 3, 7 is to link the branches 4a to 4b and the sub-branches 5a, 5b together so that they can be mobile at link points formed by these articulation elements 3, 6 and 7. Such an articulation element 3, 6, 7 corresponds, for example, to a part that can be made of wood, of plastic or of a metal or alloy such as copper or aluminium or stainless steel that can be anodized. Such a part corresponds, for example, to a non-removable flush rivet designed for a flexible, precise and durable use.

In FIG. 1A, the instrument 1 is represented in the unfolded position. In this position, the markers 8a, 8b, 8c, 8d, 8e, 8f, 8g, 8h are distant from one another in comparison to their distance apart in the folded position, illustrated in FIGS. 3 and 4, where the latter are close, or even substantially side by side with one another.

In FIG. 2, the gap between each marker 8a, 8b, 8c, 8d, 8e, 8f, 8g, 8h is particular. In this unfolded position, all the branches 4a to 4h and sub-branches 5a, 5b linked together and which are therefore mobile relative to one another, form between them an aperture angle α of approximately 90°.

When the instrument 1 is in a maximum folded position, the markers 8a, 8b, 8c, 8d, 8e, 8f, 8g, 8h are close or even side by side with one another, as is illustrated in FIGS. 3 and 4.

In this maximum folded position, the measuring instrument 1 has a very reduced bulk, for example having the following dimensions:
- length of the order of 195 to 205 mm;
- width of the order of 55 to 65 mm, and
- thickness of the order of 1.5 to 2.3 mm.

The measuring instrument 1 can thus be easily transported.

In the maximum unfolded position, the gap between the markers 8a and 8d of the branches 4a and 4h is approximately 750 to 850 mm.

In this instrument 1, the branches 4a to 4h form four pairs 2a, 2b, 2c, 2d of branches which are linked together, at one of their ends, by an articulation element 3.

The pairs formed by these branches 4a to 4h are as follows:
- 4a and 4b form the pair 2a;
- 4c and 4d form the pair 2b;
- 4e and 4f form the pair 2c, and
- 4g and 4h form the pair 2d.

One branch 4a to 4h of each pair 2a, 2b, 2c, 2d of branches is linked to two branches 4a to 4h of different pairs by articulation elements 6.

For example, in FIG. 2:
- the branch 4b of the pair 2a is linked by articulation elements 6 to the branches 4c and 4e of the pairs 2b and 2c;
- the branch 4d of the pair 2b is linked by articulation elements 6 to the branches 4e and 4g of the pairs 2c and 2d;
- the branch 4e of the pair 2c is linked by articulation elements 6 to the branches 4d and 4b of the pairs 2b and 2a, and
- the branch 4g of the pair 2d is linked by articulation elements 6 to the branches 4f and 4d of the pairs 2c and 2b.

It will also be noted that the branches 4b and 4g of each of the pairs 2a and 2d comprise, at their free end, an articulation element 6, and not a marker 8a, 8b, 8c, 8d, 8e, 8f, 8g, 8h as is the case for the other branches 4a, 4c, 4d, 4e, 4f, 4h.

In this instrument 1, the sub-branches 5a and 5b are each linked by articulation elements 7 to two branches 4a, 4c, 4f, 4h of different pairs comprising fewer than three articulation elements 3, 6.

For example, in FIGS. 1A and 2, the articulation elements 7 link:
- the sub-branch 5a to the branches 4a of the pair 2a and 4c of the pair 2b, and
- the sub-branch 5b to the branches 4h of the pair 2d and 4f of the pair 2c.

By not taking into account the articulation element 7, these branches 4a and 4h belonging to the pairs 2a and 2d comprise one articulation element 3, and the branches 4c and 4f of the pairs 2b and 2c comprise two articulation elements 3 and 6.

These sub-branches 5a, 5b have, like the branches 4a, 4c, 4d, 4e, 4f and 4h, a free end which forms a marker 8g, 8f sighting to define a measurement.

The markers 8a, 8b, 8c, 8d, 8e, 8f, 8g, 8h formed both by the free end of the branches 4a, 4c, 4d, 4e, 4f and of the sub-branches 5a, 5b are always contained substantially on one and the same line, whether the instrument 1 is in the unfolded or folded position. In the present embodiment illustrated in FIGS. 1A to 4, the instrument 1 comprises eight of them. More specifically, it comprises:
- two outer markers 8a and 8d that are the first marker 8a and the fourth marker 8d;
- two inner markers 8b and 8c that are the second marker 8b and the third marker 8c, and
- four intermediate markers 8e, 8f, 8g and 8h, part of which is formed by the fifth marker 8g and the sixth marker 8h.

As is illustrated for example in FIGS. 1A and 1B, each of these markers 8a, 8b, 8c, 8d, 8e, 8f, 8g, 8h comprises, at its end, a notch 11 and a housing 9 which is capable of receiving an element suitable for producing a pointing and/or a measurement marking. This housing 9 has a diameter which is between approximately 1 mm and 3 mm. These housings 9 notably make it possible to measure the exact distance of a gap between two markers 8a, 8b, 8c, 8d, 8e, 8f, 8g, 8h.

The element which is suitable for producing a pointing or a measurement marking can, for example, be likened to a pencil point or a fine point—compass, needle, thumb tack, etc.

Thus, it is then possible to plot the primary, secondary and tertiary golden lines on the surface of a support, such as a picture to be painted, and determine the lines of force and the points of interest of this picture.

The marker 8b, formed by the free end of the branch 4e of the pair 2c which is linked to the branches 4d, 4b of the pairs 2b and 2a, comprises a visual indicator that may correspond for example to a colour or a particular shape of this marker 8b.

This visual indicator makes it possible to determine, directly and without computation, a visual measurement, relative to the Fibonacci series by the use of the value of Φ used in this series, for a segment measured between the markers 8a and 8d of the branches 4a and 4h or between the markers 8a and 8c of the branches 4a and 4e or the markers 8d and 8b of the branches 4h and 4e.

In practice, in FIG. 2, examples are given:
by positioning the markers 8a and 8d at the ends of a segment AC, it is then possible to measure the length of a segment BC from the marker 8b comprising a visual indicator and from the marker 8d without it being necessary to perform the following computation: AC/Φ=BC;
by positioning the marker 8b comprising a visual indicator and the outer marker 8d at the ends of the segment BC, it is then possible to measure or point the length:
of a segment AB from the markers 8a and 8b without it being necessary to perform the following computation: BC/Φ=AB;
of a segment BB1 from the marker 8b comprising a visual indicator and from the marker 8c without it being necessary to perform the following computation: BC/Φ=BB1;
of a segment AC from the markers 8a and 8d without it being necessary to perform the following computation: BC×Φ=AC, and
by positioning the marker 8a and the marker comprising the visual indicator 8b at the ends of the segment AB, it is then possible to measure the length of the segment BC from the marker 8b comprising a visual indicator and from the marker 8d without it being necessary to perform the following computation: AB×Φ=BC.

It will be noted that the measuring instrument 1 makes it possible to determine this constant ratio between two segments whatever the aperture angle α, thanks to its proportionality.

As has been seen previously and also illustrated by FIG. 2, the instrument 1 can have a particular unfolded position in which all the branches 4a to 4h and sub-branches 5a, 5b, which are linked together, form an aperture angle α of approximately 90°.

In this particular position, the instrument 1 then makes it possible to rapidly obtain the measurements relating to the Fibonacci series that are the palm, the hand, the span, the foot and the elbow.

As seen previously, for a measurement of the palm equal to approximately 7.4 cm, indicated in FIG. 2 by the distance d5, the measurement of:
the hand is obtained by multiplying the measurement of the palm by Φ, which is then equal to 12.36 cm and which is indicated in FIG. 2 by the distance d4;
the span is obtained by multiplying the measurement of the hand by Φ, which is then equal to 20 cm and which is indicated in FIG. 2 by the distance d3;
the foot is obtained by multiplying the measurement of the span by Φ, which is then equal to 32.36 cm and which is indicated in FIG. 2 by the distance d2, and
the elbow is obtained by multiplying the measurement of the foot by Φ, which is then equal to 52.36 cm and which is indicated in FIG. 2 by the distance d1.

It will then be understood that, from the moment that one of the measurements relating to the palm, the hand, the span, the foot or the elbow is known, the other measurements can then be determined by multiplying/dividing this known measurement by Φ. By virtue of the measuring instrument 1, there is no need to calculate these values. All that is required is to position it suitably on the support.

The measuring instrument 1 can comprise a locking element 11. This locking element 11, for example, replaces the articulation element 6 which links two sets of two pairs, such as the pairs 2a and 2b with the pairs 2c and 2d. Such a locking element 11 is illustrated, for example, for the instrument 1 represented in FIGS. 1A and 3.

This locking element 11, in addition to providing the same functions as an articulation element 3, 6, 7, can, additionally, maintain the instrument 1 in a given position contained between a maximum unfolded and folded position. Such maintenance of the instrument in a given position is obtained by actuating this locking element 11, for example by screwing. It can correspond, by way of example, to a knurled knob or even a threaded or tapped knob cooperating with a complementary threaded or tapped element.

For example in FIG. 1A, the sets of two pairs 2a, 2b and 2c, 2d are linked by this locking element 11 at the branch 4d of the set of two pairs 2a, 2b and the branch 4e of the set of two pairs 2c, 2d. In FIG. 2, it is the articulation element 6 which provides such a link of the branches 4d and 4e.

This locking element 11, or the articulation element 6, is located substantially at the centre of these two branches 4d, 4e.

This locking element 11, or the articulation element 6, can be contained on an axis of symmetry 12 which divides the measuring instrument 1 into two substantially equal parts.

Figure 5:
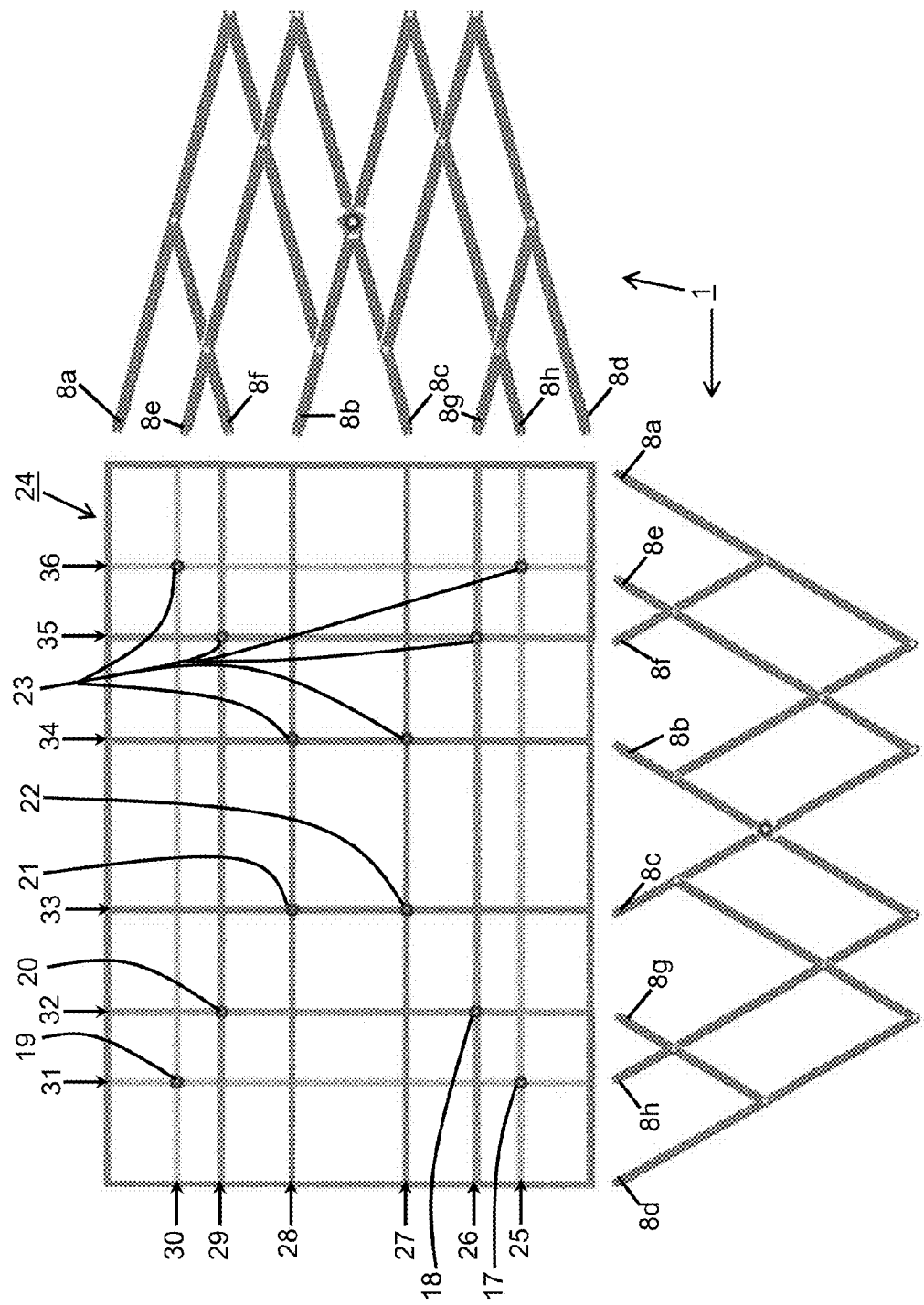
FIG. 5 illustrates an example of a plot plan obtained by the use of the instrument according to this embodiment.

In the context of the use of this measuring and/or plotting and/or sighting instrument 1, it is possible to indicate, very rapidly on a support, marks making it possible to determine a simple or complex plot plan 24 based on the golden number as illustrated in FIG. 5.

In one example of use of the instrument 1, the following steps can be performed:
positioning and unfolding the instrument 1 horizontally so that the markers 8a, 8b, 8c, 8d, 8e, 8f, 8g, 8h are located at the ends of the support, for example a picture to be painted;
maintaining the instrument 1 in the given position, by screwing the locking element 11 so as to block the measuring instrument 1 in the desired position or aperture angle α;
marking, by the element suitable for producing a measurement marking, the position of the primary golden lines corresponding to the markers 8b, 8c, then, if necessary, the secondary golden lines corresponding to the markers 8g, 8f, and the tertiary golden lines corresponding to the markers 8h and 8e, and
then performing the preceding steps by now positioning the measuring instrument 1 vertically in order to thus obtain the plot plan 24 of the golden lines.

It will be noted that, when the instrument 1 is in the vertical position, the following markers make it possible to plot the lines mentioned below:
marker 8b: an upper primary horizontal line 28;
marker 8c: a lower primary horizontal line 27;
marker 8f: an upper secondary horizontal line 29;
marker 8g: a lower secondary horizontal line 26;
marker 8e: an upper tertiary horizontal line 30, and
marker 8h: a lower tertiary horizontal line 25.
When it is in the horizontal position:
marker 8b: a right primary vertical line 34;
marker 8c: a left primary vertical line 33;
marker 8f: a right secondary vertical line 35;
marker 8g: a left secondary vertical line 32;
marker 8e: a right tertiary vertical line 36, and
marker 8h: a left tertiary vertical line 31.

This plot plan 24, illustrated in FIG. 5, can comprise:
- a left upper tertiary point 19 corresponding to the intersection of the upper tertiary horizontal line 30 with the left tertiary vertical line 31;
- a left lower tertiary point 17 corresponding to the intersection of the lower tertiary horizontal line 25 with the left tertiary vertical line 31;
- a left upper secondary point 20 corresponding to the intersection of the upper secondary horizontal line 29 with the left secondary vertical line 32;
- a left lower secondary point 18 corresponding to the intersection of the lower secondary horizontal line 26 with the left secondary vertical line 32;
- a left upper primary point 21 corresponding to the intersection of the upper primary horizontal line 28 with the left primary vertical line 33, and
- a left lower primary point 22 corresponding to the intersection of the lower primary horizontal line 27 with the left primary vertical line 33.

According to the same principle, there are also obtained the primary, secondary and tertiary points 23 on the right with, notably, the right primary vertical line 34, right secondary vertical line 35, right tertiary vertical line 36. The concepts of left, right, lower and upper line or point are relative to the vertical and horizontal median lines of the table illustrated in FIG. 5.

This measuring instrument 1 can also be used:
- to make it possible to plot circles of a diameter much greater than that of a precision compass;
- as a viewer and thus make it possible to frame a landscape and transfer the dimensions to a support for a pictorial representation, but also analyse a landscape, a geometrical construction, a sculpture, a drawing, a landscaped garden or a work of art, and
- to determine the proportions needed to draw and/or paint human faces or bodies in realistic proportions.

Such an instrument 1 is manufactured according to the method comprising the following steps:
- cutting, for example by laser, from a sheet of wood, aluminium, steel or plastic, of branches 4a, 4b, 4c, 4d, 4e, 4f, 4g, 4h and of sub-branches 5a, 5b;
- assembly of branches 4a, 4b, 4c, 4d, 4e, 4f, 4g, 4h from articulation elements 3, 6, and
- production, at a free end of the branches 4a, 4c, 4d, 4e, 4f, 4h, of a marker 8a, 8b, 8c, 8d, 8e, 8f, 8g, 8h sighting to define a measurement.

The assembly step comprises the following sub-steps:
- formation of pairs of branches 2a, 2b, 2c, 2d linked together at one of their ends by an articulation element 3, and
- linking of a branch 4b, 4d, 4e, 4g of each pair 2a, 2b, 2c, 2d of branches to two branches of different pairs by articulation elements 6.

The method also comprises a step of organization of the sub-branches 5a, 5b in the measuring instrument 1 by linking each of these sub-branches 5a, 5b by articulation elements 7 to the branches 4a, 4c, 4f, 4h of different pairs 2a, 2b, 2c, 2d comprising fewer than three articulation elements 3, 6.

The invention claimed is:

1. Measuring and/or plotting and/or sighting instrument comprising on one and the same line a first marker, a second marker, a third marker, a fourth marker and a fifth marker linked together by a link element allowing a relative displacement of the markers according to at least one of the following formulas:

$$\frac{d1}{d2} = \frac{d3}{d4} = \Phi \qquad (i)$$

with:
- d1 being the distance between the first and fourth markers;
- d2 being the distance between the second and fourth markers;
- d3 being the distance between the third and fourth markers;
- d4 being the distance between the fifth and fourth markers;
- Φ being a constant number, and $$\frac{d1}{d2} = \frac{d3}{d4} = \frac{d4}{d5} = \Phi \qquad (ii)$$

with:
- d1 being the distance between the first and fourth markers;
- d2 being the distance between the second and fourth markers;
- d3 being the distance between the third and fourth markers;
- d4 being the distance between the fifth and fourth markers;
- d5 being the distance between the sixth and fourth markers; and
- Φ being a constant number.

2. Instrument according to claim 1, wherein the link element comprises deformable parallelograms.

3. Instrument according to claim 1, wherein the link element comprises branches forming, at their free end, the marker sighting to define a measurement, said branches being linked together by articulation elements so as to provide a trend between an unfolded position in which the markers are distant from one another and a folded position in which these markers are substantially side by side with one another.

4. Instrument according to claim 3, wherein the link element comprises sub-branches of a length less than that of the branches.

5. Instrument according to claim 4, wherein the branches form four pairs of branches which are linked together at one of their ends by an articulation element.

6. Instrument according to claim 5, wherein a branch of each pair of branches is linked to two branches of different pairs by articulation elements.

7. Instrument according to claim 5, wherein the sub-branches are each linked by articulation elements to two branches of different pairs comprising fewer than three articulation elements.

8. Instrument according to claim 4, wherein the free end of the sub-branches forms a marker sighting to define a measurement.

9. Instrument according to claim 1, wherein each marker comprises a housing capable of receiving an element suitable for producing a pointing and/or a measurement marking.

10. Instrument according to claim 1, wherein the link element comprises an element for locking said instrument in a given position.

11. Instrument according to claim 4, wherein the ends of a branch or of a sub-branch comprise articulation elements.

12. Instrument according to claim 4, wherein the sub-branches are straight and of the same length.

13. Instrument according to claim 3, wherein the branches are straight.

14. Method of performing a measurement using a measuring instrument according to claim 1, which comprises the following steps:

positioning and unfolding said instrument in a given position sighting to produce a relative displacement of markers on one and the same line according to any of the following formulas:

$$\frac{d1}{d2} = \frac{d3}{d4} = \Phi, \quad (i)$$

when the instrument comprises a first marker, a second marker, a third marker, a fourth marker and a fifth marker linked together by a link element, with:
d1 being the distance between the first and fourth markers;
d2 being the distance between the second and fourth markers;
d3 being the distance between the third and fourth markers;
d4 being the distance between the fifth and fourth markers;
$\Phi$ being a constant number and $$\frac{d1}{d2} = \frac{d3}{d4} = \frac{d4}{d5} = \Phi, \quad (ii)$$

when the instrument comprises a first marker, a second marker, a third marker, a fourth marker, a fifth marker and a sixth marker linked together by a link element, with:
d1 being the distance between the first and fourth markers;
d2 being the distance between the second and fourth markers;
d3 being the distance between the third and fourth markers;
d4 being the distance between the fifth and fourth markers;
d5 being the distance between the sixth and fourth markers; and
$\Phi$ being a constant number,
maintaining said instrument in the given position, and marking the measurement performed.

15. Method according to claim 14, wherein $\Phi$ is equal or substantially equal to 1.5 or 1.6 or 1.62 or 1.618 or $(1+\sqrt{5})/2$.

16. Instrument according to claim 1, wherein $\Phi$ is equal or substantially equal to 1.5 or 1.6 or 1.62 or 1.618 or $(1+\sqrt{5})/2$.

17. Instrument according to claim 1, wherein the link element comprises four deformable parallelograms.

18. Instrument according to claim 1, wherein the link element comprises deformable parallelograms in which the ratio of lengths of two contiguous sides is equal to $$\frac{a}{b} = \Phi.$$

19. Instrument according to claim 1, wherein the link element comprises four deformable parallelograms in which the ratio of lengths of two contiguous sides is equal to $$\frac{a}{b} = \Phi.$$

20. Instrument according to claim 2, wherein the link element comprises branches forming, at their free end, the marker sighting to define a measurement, said branches being linked together by articulation elements so as to provide a trend between an unfolded position in which the markers are distant from one another and a folded position in which these markers are substantially side by side with one another.

* * * * *